(12) United States Patent
Choi et al.

(10) Patent No.: US 11,209,693 B2
(45) Date of Patent: Dec. 28, 2021

(54) LIQUID CRYSTAL DISPLAY

(71) Applicant: LG CHEM, LTD., Seoul (KR)

(72) Inventors: Jae Min Choi, Daejeon (KR); Jin Yong Park, Daejeon (KR); Sang Hyun Nah, Daejeon (KR); Won Chul Lee, Daejeon (KR); Jun Cheol Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/967,105

(22) PCT Filed: Sep. 20, 2019

(86) PCT No.: PCT/KR2019/012202
§ 371 (c)(1),
(2) Date: Aug. 3, 2020

(87) PCT Pub. No.: WO2020/060263
PCT Pub. Date: Mar. 26, 2020

(65) Prior Publication Data
US 2021/0048708 A1     Feb. 18, 2021

(30) Foreign Application Priority Data
Sep. 21, 2018 (KR) ........................ 10-2018-0114410

(51) Int. Cl.
*G02F 1/1335* (2006.01)
*G02F 1/1333* (2006.01)
*G02F 1/1337* (2006.01)

(52) U.S. Cl.
CPC .. *G02F 1/133528* (2013.01); *G02F 1/133305* (2013.01); *G02F 1/133711* (2013.01)

(58) Field of Classification Search
None
See application file for complete search history.

(56) References Cited

U.S. PATENT DOCUMENTS

| 9,575,355 B2 | 2/2017 | Kim et al. |
| 10,274,646 B2 | 4/2019 | Park et al. |

(Continued)

FOREIGN PATENT DOCUMENTS

| JP | 8-110521 A | 4/1996 |
| JP | 2014-206702 A | 10/2014 |

(Continued)

OTHER PUBLICATIONS

International Search Report from PCT/KR2019/012202, dated Jan. 30, 2020.

(Continued)

*Primary Examiner* — Ryan Crockett
(74) *Attorney, Agent, or Firm* — Dentons US LLP

(57) ABSTRACT

Provided is a liquid crystal display comprising: a liquid crystal cell; an upper polarizing plate provided on one surface of the liquid crystal cell and including a first polarizer and a low moisture-permeable film disposed on one surface of the first polarizer so as to face the liquid crystal cell; and a lower polarizing plate provided on the other surface of the liquid crystal cell and including a second polarizer, wherein a ratio of a shrinkage force in a direction parallel to the absorption axis of the second polarizer of the low moisture-permeable film to a shrinkage force in an absorption-axial direction of the second polarizer is 30% or more.

12 Claims, 6 Drawing Sheets

(56) References Cited

U.S. PATENT DOCUMENTS

| | | |
|---|---|---|
| 2004/0046909 A1 | 3/2004 | Sekiguchi |
| 2009/0257003 A1 | 10/2009 | Yoshihara et al. |
| 2011/0273646 A1 | 11/2011 | Fukagawa et al. |
| 2015/0212368 A1* | 7/2015 | Yonemoto ............ G02B 5/3025 349/61 |
| 2016/0026022 A1 | 1/2016 | Jung et al. |
| 2016/0048057 A1* | 2/2016 | Sekiguchi .............. G02B 5/305 349/61 |
| 2016/0252660 A1* | 9/2016 | Matsuno ................... B32B 7/12 359/487.02 |
| 2016/0252665 A1 | 9/2016 | Lee et al. |
| 2018/0356679 A1* | 12/2018 | Iida ................... G02F 1/133528 |
| 2019/0154884 A1* | 5/2019 | Kim et al. ............ B32B 27/306 |
| 2020/0326587 A1 | 10/2020 | Heo et al. |

FOREIGN PATENT DOCUMENTS

| | | |
|---|---|---|
| JP | 2014-219438 A | 11/2014 |
| JP | 2015-532459 A | 11/2015 |
| JP | 2017-194717 A | 10/2017 |
| JP | 2017-211433 A | 11/2017 |
| KR | 10-2011-0097078 | 8/2011 |
| KR | 10-2014-0146898 A | 12/2014 |
| KR | 10-2015-0025975 A | 3/2015 |
| KR | 10-2015-0043641 A | 4/2015 |
| KR | 10-1701076 A | 1/2017 |
| KR | 10-2017-0104966 A | 9/2017 |
| KR | 10-2017-0121522 A | 11/2017 |
| KR | 10-2018-0097970 A | 9/2018 |
| TW | 201631340 A | 9/2016 |
| TW | 201806777 A | 3/2018 |
| WO | 2005066924 A2 | 7/2005 |
| WO | 2014/057949 A1 | 4/2014 |
| WO | 2015/166941 A1 | 11/2015 |
| WO | 2015190190 A1 | 12/2015 |
| WO | 2017-170216 | 10/2017 |
| WO | 2017/209473 A1 | 12/2017 |

OTHER PUBLICATIONS

Written Opinion of the ISA from PCT/KR2019/012202, dated Jan. 30, 2020.

Office Action of Korean Patent Office in Appl'n No. 10-2018-0114410, dated Dec. 15, 2020.

* cited by examiner

[FIG. 1]
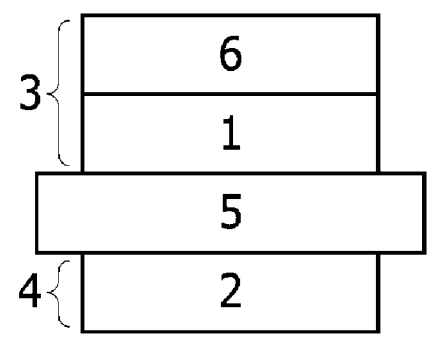
[FIG. 2]
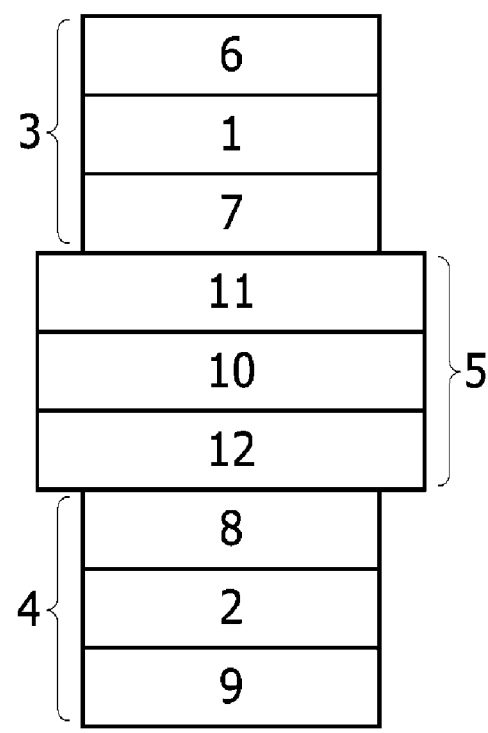

[FIG. 3]
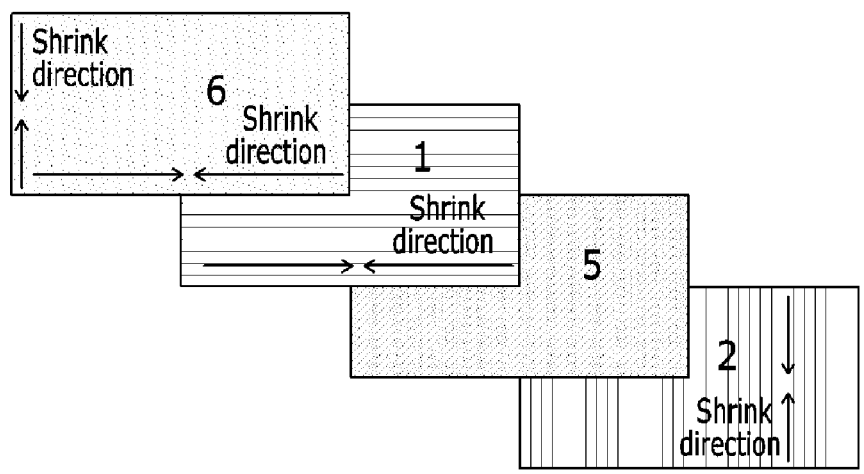
[FIG. 4]
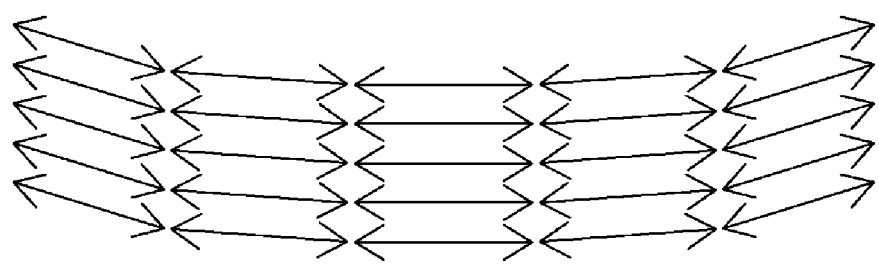

[FIG. 5]
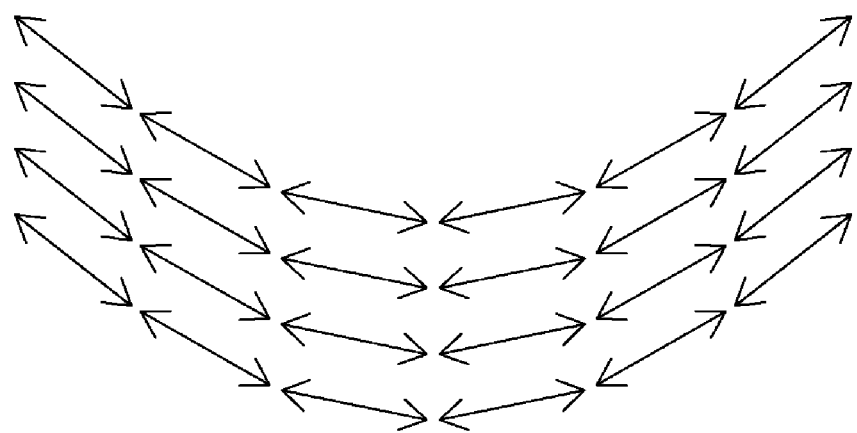

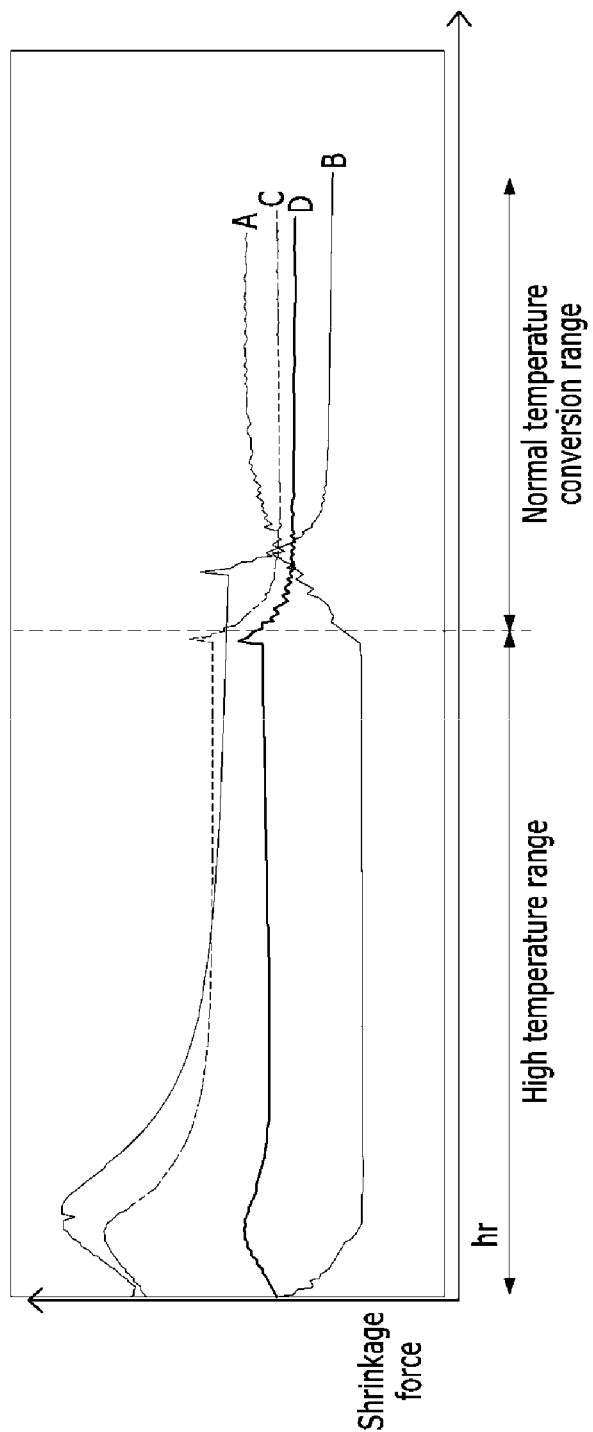
[FIG. 6]

[FIG. 7]
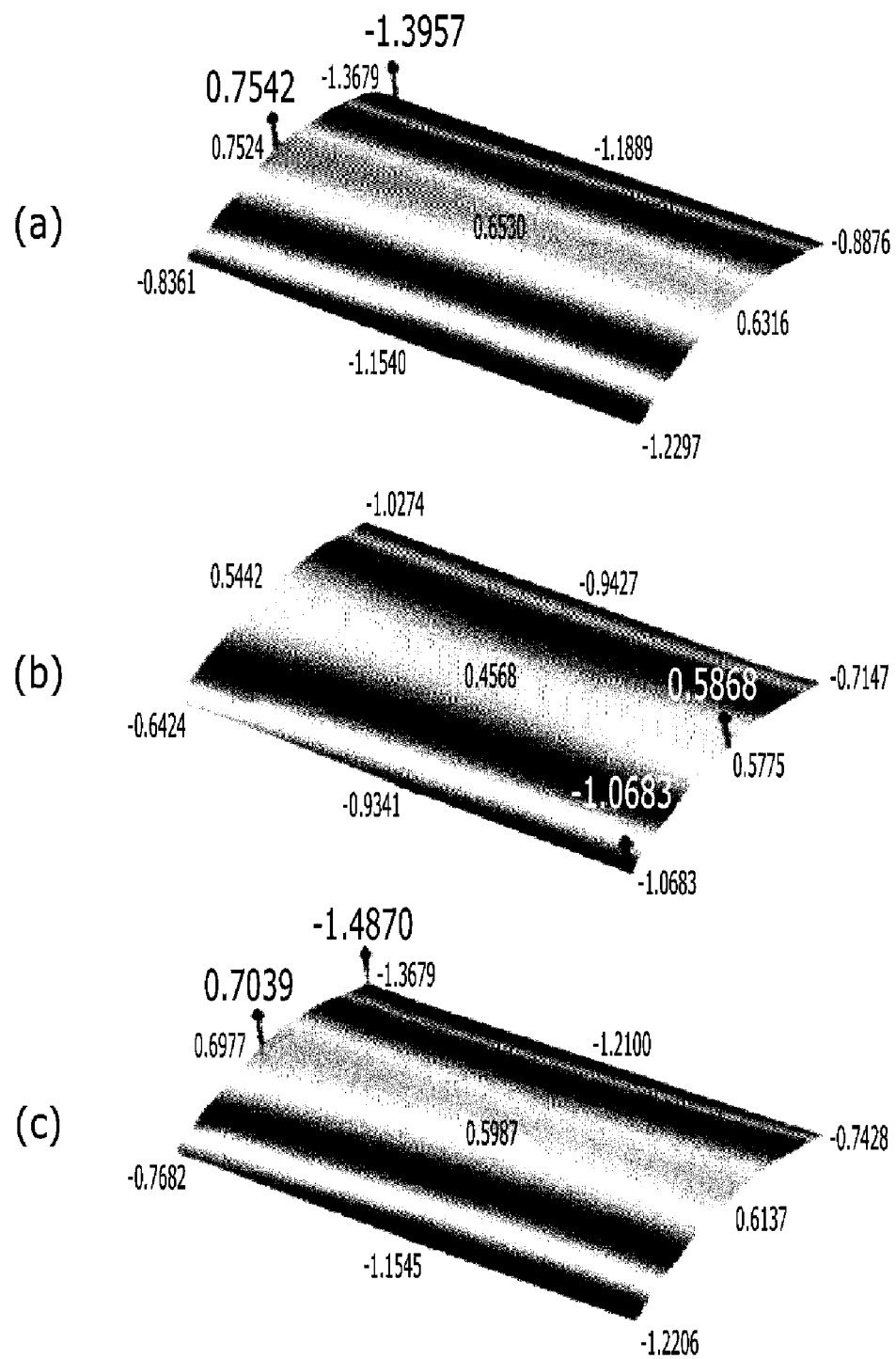

[FIG. 8]
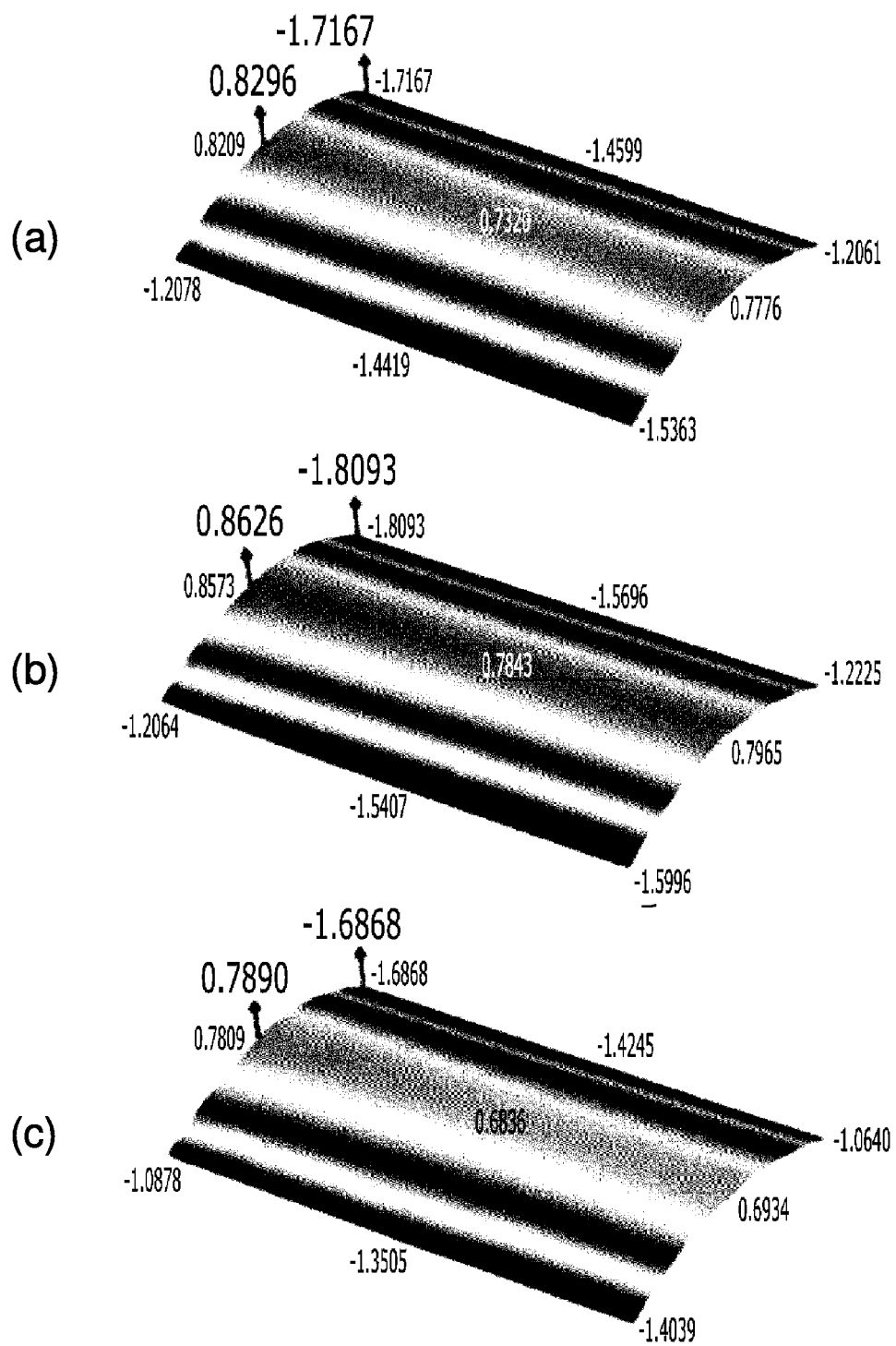

LIQUID CRYSTAL DISPLAY

CROSS-REFERENCE TO RELATED APPLICATION(S)

This application is a National Stage Application of International Application No. PCT/KR2019/012202 filed on Sep. 20, 2019, which claims the benefit of priority to Korean Patent Application No. 10-2018-0114410 filed with the Korean Intellectual Property Office on Sep. 21, 2018, the entire disclosure of which is incorporated herein by reference.

FIELD OF THE INVENTION

The present invention relates to a liquid crystal display.

BACKGROUND OF THE INVENTION

Recently, as video display devices, flat panel displays which can be slim and lightweight have been mainly developed. These flat panel displays include a liquid crystal display (LCD), an organic light emitting display (OLED), a plasma display panel (PDP), a field-effect display (FED), and the like.

Here, the liquid crystal display is a device that displays an image by using changes in the arrangement of liquid crystal molecules and light transmission according to provided electrical signals. Since these liquid crystal panels are not self-light emitting elements, they must essentially include a backlight unit for providing light to the liquid crystal panel. Therefore, the liquid crystal panel presents limitations in slimming display devices. The organic light emitting display emits light using an organic material. In particular, since the backlight unit is unnecessary as compared with the liquid crystal display, it has an advantage in reducing the thickness and weight.

Meanwhile, in recent years, a trend toward thinning and weight reduction for liquid crystal displays has increased, and slimmer products due to competition with the organic light emitting display are needed. Consequently, the thickness of each layer of the backlight unit, liquid crystal cell, module, etc. that constitute the liquid crystal display is manufactured thinly, and thus more slimmed products are developed. In order to minimize the bezel, products that match the sizes of the liquid crystal display and the polarizing plate are continuously being developed. This causes problems such as an increase in the extent of damage due to external factors, and therefore, in order to minimize damage, there is a need to improve the hardness of the polarizing plate included in the visible side of the video display device.

Meanwhile, the polarizer essentially included in the liquid crystal display has a problem that shrinkage deformation easily occurs under durability conditions such as high temperature and high humidity. In particular, in the case where the thickness of each layer constituting the liquid crystal display for slimming is manufactured to be thin, if the polarizer is deformed, the stress affects a protective film, a liquid crystal cell, and the like, resulting in bending. As a result, it leads to problems such as changes in physical properties of the polarizing plate including the same, causing light leakage in the liquid crystal display and the like.

SUMMARY OF THE INVENTION

Technical Problem

It is an object of the present invention to provide a liquid crystal display that effectively prevents bending by offsetting shrinkage of a polarizer, and therefore improves a bending phenomenon at a high temperature, has excellent shape stability, has excellent durability such as hardness, and further prevents a rainbow phenomenon and thus exhibits excellent visibility.

Technical Solution

In one aspect of the present invention, there is provided a liquid crystal display including: a liquid crystal cell; an upper polarizing plate provided on one surface of the liquid crystal cell and including a first polarizer and a low moisture-permeable film disposed on one surface of the first polarizer so as to face the liquid crystal cell; and a lower polarizing plate provided on the other surface of the liquid crystal cell and including a second polarizer, wherein a ratio of the shrinkage force in a direction parallel to the absorption axis of the second polarizer of the low moisture-permeable film to the shrinkage force in an absorption-axial direction of the second polarizer is 30% or more.

Hereinafter, the liquid crystal display according to a specific embodiment of the present invention will be described in more detail.

In this specification, terms such as first, second, and the like can be used to describe various components, and the terms are used only to discriminate one component from another component.

Hereinafter, the liquid crystal display according to one embodiment of the present invention will be described with reference to FIGS. 1 and 2. FIGS. 1 and 2 schematically illustrate a liquid crystal display according to one embodiment of the invention.

Referring to FIG. 1, a liquid crystal display according to one embodiment of the present invention includes: a liquid crystal cell 5; an upper polarizing plate 3 provided on one surface of the liquid crystal cell and including a first polarizer 1 and a low moisture-permeable film 6 disposed on one surface of the first polarizer so as to face the liquid crystal cell; and a lower polarizing plate 4 provided on the other surface of the liquid crystal cell and including a second polarizer 2.

In this regard, the present inventors conducted intensive research on the liquid crystal display, and found through experiments that a liquid crystal display, satisfying the condition that a ratio of the shrinkage force in a direction parallel to the absorption axis of the second polarizer of the low moisture-permeable film 6 to the shrinkage force in an absorption-axial direction of the second polarizer 2 is more preferably 30% or more or 30 to 40%, offsets the shrinkage of a polarizer and thus effectively prevents the problem that the liquid crystal display itself is bent, and also prevents a rainbow phenomenon and thus exhibits excellent visibility, and further has high hardness and thus is excellent in durability.

Specifically, a polarizer essentially contained in the liquid crystal display has a problem in that shrinkage deformation easily occurs under high temperature and high humidity conditions or under normal temperature conditions after being in a high temperature and high humidity environment. In particular, since the polarizer is a film stretched in the absorption-axial direction, it has a characteristic that the shrinkage force in the absorption-axial direction is high, but shrinkage occurs in the absorption-axial direction of the polarizer under high temperature and high humidity conditions or under normal temperature conditions after being in a high temperature and high humidity environment, which causes shrinkage of a liquid crystal cell, a protective film, etc., and finally bending of the liquid crystal display can occur.

However, according to one embodiment, the low moisture-permeable film 6 positioned on a visible side of the liquid crystal display is positioned to face the second polarizer 2 with respect to the liquid crystal cell 5. Therefore, the low moisture-permeable film shrinks together in a direction parallel to the absorption-axial direction in which the second polarizer shrinks, thereby offsetting and mitigating the shrinkage of the second polarizer.

More specifically, the shrinkage offsetting effect of the polarizer will be described with reference to FIG. 3. FIG. 3 is a view schematically illustrating a liquid crystal display according to one embodiment of the invention and a shrink direction of each layer. Referring to FIG. 3, the upper polarizing plate 3 positioned on one surface of the liquid crystal cell 5 so as to face the second polarizer 2 includes the low moisture-permeable film 6, wherein the second polarizer shrinks in the absorption-axial direction (vertical direction in FIG. 3). In order to offset and mitigate shrinkage in the absorption-axial direction of the second polarizer, it is preferable that shrinkage occurs in a direction parallel to the absorption-axial direction (vertical direction in FIG. 3) in the low moisture-permeable film. Specifically, the ratio of the shrinkage force in a direction parallel to the absorption axis of the second polarizer of the low moisture-permeable film to the shrinkage force in an absorption-axial direction of the second polarizer is more preferably 30% or more. Since the low-moisture-permeable film satisfies the above-described shrinkage force conditions, the shrinkage of the second polarizer can be offset and mitigated, thereby preventing the problem that the liquid crystal display is bent.

The low moisture-permeable film 6 can have in-plane retardation (Re) of 500 nm or less, 0 to 400 nm, or 0 to 300 nm. When the in-plane retardation of the low moisture-permeable film exceeds 500 nm, it is difficult to offset the shrinkage of the second polarizer 2, which causes a problem that the liquid crystal display is bent and the hardness is low such that deformation can occur by an external force.

In addition, the low moisture-permeable film 6 can have thickness direction retardation (Rth) of 7000 to 10,000 nm. When the thickness direction retardation is less than 7000 nm, a rainbow phenomenon occurs which can cause a decrease in the visibility of the liquid crystal display. When the thickness direction retardation exceeds 10,000 nm, it can cause a problem that the thickness increases or the cost of the stretching process increases to meet the same physical properties.

Specifically, the low moisture-permeable film 6 can have in-plane retardation (Re) of 500 nm or less and thickness direction retardation (Rth) of 7000 to 10,000 nm. The low moisture-permeable film that satisfies the in-plane retardation and the thickness direction retardation can offset the shrinkage of the second polarizer 2, prevent a bending phenomenon of the liquid crystal display, prevent a rainbow phenomenon, and thus improve visibility.

When d represents a thickness of the low moisture-permeable film 6, nx represents a refractive index in the in-plane slow axis direction, ny represents an in-plane fast axis direction, and nz represents a refractive index in the thickness direction, the in-plane retardation (Re) and the thickness direction retardation (Rth) can be defined by the following equations, respectively.

$$Re=(nx-ny)*d$$

$$Rth=[(nx+ny)/2-nz]*d$$

In addition, the retardation value can be defined as absolute values corresponding to positive numbers.

The slow axis can be defined as a direction in which the in-plane refractive index of the low moisture-permeable film 6 is a maximum, and the fast axis can be defined as a direction perpendicular to the slow axis on the plane.

The low moisture-permeable film 6 can have a water vapor transmission rate (WVTR) of 30 g/m²·day or less, or 20 g/m²·day or less. Since the low moisture-permeable film is positioned outermost of the visible side of the liquid crystal display according to the embodiment, the water vapor transmission rate is as low as 30 g/m²·day or less, so it is possible to prevent problems caused by external high humidity conditions, specifically, it is possible to prevent the shrinkage of the polarizer that easily causes shrinkage deformation under high temperature and high humidity conditions.

In addition, the low moisture-permeable film 6 can have a coefficient of thermal expansion of −30 to 30 μm/m° C. When the coefficient of thermal expansion of the low moisture-permeable film is excessively high or low, the low moisture-permeable film itself can be bent, and the entire liquid crystal display including the film can be bent.

The low moisture-permeable film 6 can be a biaxially stretched polyester film. The polyester can be a polymer, a copolymer, or a blend resin obtained by polycondensation of dicarboxylic acid and diol. For example, the dicarboxylic acid can be terephthalic acid, isophthalic acid, o-phthalic acid, 2,5-naphthalene dicarboxylic acid, 2,6-naphthalene dicarboxylic acid, 1,4-naphthalene dicarboxylic acid, 1,5-naphthalene dicarboxylic acid, diphenylcarboxylic acid, diphenoxyethane dicarboxylic acid, diphenylsulfonecarboxylic acid, anthracene dicarboxylic acid, 1,3-cyclopentane dicarboxylic acid, 1,3-cyclohexane dicarboxylic acid, 1,4-cyclohexane dicarboxylic acid, hexahydrophthalic acid, hexahydroisophthalic acid, malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimelic acid, azelaic acid, dimer acids, sebacic acid, suberic acid, or dodecadicarboxylic acid, or the like, without being limited thereto. In addition, the diol can be, for example, ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl)propane, bis(4-hydroxyphenyl)sulfone, or the like, without being limited thereto.

On the other hand, from the viewpoint that the polyester exhibits crystallinity, it can include aromatic polyesters, for example, polyethylene terephthalate (PET), polyethylene naphthalate (PEN), or a copolymer containing them, without being limited thereto.

A polyester film can be obtained, for example, by a method in which the polyester resin as set forth above is melt-extruded in a film shape and then cooled and solidified using a casting drum to form a film. Further, polyester can be uniaxially or biaxially stretched to produce a stretched polyester film.

In particular, when polyester is biaxially stretched, specific molecular arrangements can appear in the polyester film depending on the stretch ratio between the transverse direction (TD) stretch and the mechanical direction (MD) stretch.

Specifically, FIG. 4 is a diagram showing the molecular arrangement that appears in the biaxially stretched polyester film when the longitudinal stretch ratio is significantly higher than the transverse stretch ratio. According to FIG. 4, it can be confirmed that the ratio of molecules arranged in the longitudinal direction is significantly higher than the ratio of molecules arranged in the transverse direction, thus exhibiting optical anisotropy. In addition, it can be confirmed that the spacing between the molecular chains is narrow, and thus the mobility is low.

On the other hand, FIG. 5 is a diagram showing the molecular arrangement that appears in the biaxially stretched polyester film when the longitudinal stretch ratio and the transverse stretch ratio are similar. According to FIG. 5, it can be confirmed that both the ratios of the molecules arranged in the longitudinal direction and the molecules arranged in the transverse direction are high, thus exhibiting optical isotropy. In addition, it can be confirmed that the spacing between the molecular chains is wide and thus the mobility is high, and further, the hardnesses of the longitudinal direction and the transverse direction are similar.

Therefore, in the process of biaxially stretching the polyester film, a biaxially stretched polyester film having optical isotropy can be obtained by similarly controlling the longitudinal stretch ratio and the transverse stretch ratio. In addition, the biaxially stretched polyester-based film in which the longitudinal stretch ratio and the transverse stretch ratio are similarly controlled can have an in-plane retardation (Re) of 500 nm or less, and the hardnesses of the longitudinal direction and the transverse direction are similar, which can thus prevent the problem that the polarizing plate is damaged by external factors.

When the polyester film exhibiting such low retardation is used as the low moisture-permeable film 6, shrinkage of the low moisture-permeable film can occur greatly in a direction parallel to the absorption axis of the second polarizer, thereby effectively offsetting and mitigating the shrinkage of the second polarizer, and the low moisture-permeable film itself also has extremely high hardness.

The first and second polarizers 1 and 2 are films capable of converting natural light or polarized light into arbitrary polarized light, generally specific linearly polarized light. The first and second polarizers include those produced by adsorbing a dichroic material such as iodine or a dichroic dye to a hydrophilic polymer film such as a polyvinyl alcohol-based film, a partially-formalized polyvinyl alcohol-based film, or a partially-saponified ethylene-vinyl acetate copolymer-based film, and then stretching the hydrophilic polymer film, and a polyene-based oriented film such as a film of a dehydration product of polyvinyl alcohol or a dehydrochlorination product of polyvinyl chloride, without being limited thereto. In an exemplary embodiment, the polarizers can include a polyvinyl alcohol-based film containing iodine, which can have a high degree of polarization and can exhibit excellent adhesion to the protective film, without being limited thereto.

Referring to FIG. 2, the liquid crystal cell 5 includes a color filter substrate 11, a TFT (thin film transistor) array substrate 12, and a liquid crystal layer 10 interposed between the color filter substrate and the TFT array substrate.

In addition, the upper polarizing plate 3 can further include a protective film 7 interposed between the first polarizer 1 and the color filter substrate 11, and can be provided on the color filter substrate of the liquid crystal cell 5. The low moisture-permeable film 6 can be disposed on the upper surface of the upper polarizing plate, that is, on the visible side. Since the low moisture-permeable film having a water vapor transmission rate of 30 g/m²·day or less is disposed on the visible side, it is possible to effectively prevent the shrinkage of the polarizer that easily causes shrinkage deformation under high temperature and high humidity conditions.

Meanwhile, the lower polarizing plate 4 further includes protective films 8 and 9 provided on at least one surface of the second polarizer 2 and that can be provided on the TFT array substrate 12 of the liquid crystal cell 5.

Although not specifically illustrated in FIGS. 1 and 2, a backlight unit disposed on one surface of the lower polarizing plate 4 so as to face the liquid crystal cell 5 can be further included. In addition, the color filter substrate 11 can include a black matrix for preventing light leakage, red, green, and blue color filters, and a common electrode which is formed of a transparent conductive oxide such as ITO or IZO and corresponds to an electric field generating electrode, on a lower surface of a base including a transparent insulating material such as glass or plastic.

Furthermore, the TFT array substrate 12 can include a thin film transistor composed of a gate electrode, a gate insulating film, a semiconductor layer, a resistive contact layer, and source/drain electrodes, and a pixel electrode which is formed of a transparent conductive oxide such as ITO or IZO and corresponds to an electric field generating electrode, on a substrate made of a transparent insulating material such as glass or plastic.

The plastic substrate capable of being used for the color filter substrate 11 and the TFT array substrate 12 can be a plastic substrate such as polyethylene terephthalate (PET), polycarbonate (PC), polyimide (PI), polyethylene naphthalate (PEN), polyether sulfone (PES), polyarylate (PAR), and a cycloolefin copolymer (COC) which can be used for displays, without being limited thereto. In addition, the color filter substrate and the TFT array substrate can include a flexible material.

The liquid crystal layer 10 can be a twisted nematic (TN) mode, a vertical alignment (VA) mode, a horizontal alignment (IPS, FFS) mode, or the like, which has positive dielectric anisotropy.

When an electric field is not applied to the liquid crystal layer 10 due to no voltage difference between the pixel electrode and the common electrode, that is, the electric field generating electrodes, major axes of liquid crystals of the liquid crystal layer are arranged parallel to surfaces of the color filter substrate 11 and the TFT array substrate 12, and the liquid crystals of the liquid crystal layer have a spirally 90 degree twisted structure from the color filter substrate to the TFT array substrate.

Polarization of linearly polarized light is changed by retardation due to anisotropy of indices of refraction of the liquid crystals as the linearly polarized light passes through the liquid crystal layer 10. A linear polarization direction of the light passing through the liquid crystal layer can be rotated by 90° by adjusting dielectric anisotropy ($\Delta\varepsilon$) or chiral pitch of the liquid crystals, a thickness of the liquid crystal layer, that is, a cell gap, or the like.

The backlight unit can generally include a light source, a light guide plate, a reflective film, and the like. Backlight units can be divided into a direct type, a side light type, a sheet-light source type, and the like, depending upon configurations thereof.

The protective films 7, 8, and 9 included in the upper polarizing plate 3 and the lower polarizing plate 4 are not particularly limited as long as they are protective films used as polarizer protective films, and examples thereof can include a COP (Cyclo-Olefin Polymer)-based film, an acrylic film, a TAC (Tri-Acetyl Cellulose)-based film, a COC (Cyclo-Olefin Copolymer)-based film, a PNB (Polynorbornene)-based film, and a PET (Polyethylene Terephthalate)-based film.

Advantageous Effects

The present invention provides a liquid crystal display that effectively prevents bending by offsetting the shrinkage of the polarizer, and therefore, improves a bending phenomenon at a high temperature, has excellent shape stability, has excellent durability such as hardness, and further prevents a rainbow phenomenon and thus exhibits excellent visibility.

BRIEF DESCRIPTION OF THE DRAWINGS

FIGS. 1 and 2 are schematic sectional views of a liquid crystal display according to an embodiment of the present invention.

FIG. 3 is a view schematically illustrating a liquid crystal display according to one embodiment of the invention and a shrink direction of each layer.

FIG. 4 is a diagram showing the molecular arrangement that appears in the biaxially stretched polyester film when the longitudinal stretch ratio is significantly higher than the transverse stretch ratio.

FIG. 5 is a diagram showing the molecular arrangement that appears in the biaxially stretched polyester film when the longitudinal stretch ratio and the transverse stretch ratio are similar.

FIG. 6 is a graph showing the shrinkage force (direction parallel to the absorption axis and direction perpendicular to the absorption axis) according to the temperature change of the films of Example 1 and Comparative Example 1.

FIG. 7 shows the result of the bending prevention evaluation of Example 1-1 (FIG. 7A), Example 1-2 (FIG. 7B), and Example 1-3 (FIG. 7C).

FIG. 8 shows the results of the bending prevention evaluation of Comparative Example 1-1 (FIG. 8A), Comparative Example 1-2 (FIG. 8B), and Comparative Example 1-3 (FIG. 8C).

DETAILED DESCRIPTION OF THE EMBODIMENTS

Hereinafter, the present invention is described in further detail with reference to examples. However, these examples are for illustrative purposes only and are not intended to limit the scope of the present invention.

Example 1

The low moisture-permeable film 6, the first polarizer 1, the protective film 7, the color filter substrate 11, the liquid crystal layer 10, the TFT array substrate 12, the protective film 8, the second polarizer 2, and the protective film 9 in Table 1 below represent the configuration of evaluation objects, such as bending prevention evaluation or the like mentioned below. In order to perform a smooth evaluation, the liquid crystal cell was replaced with a glass substrate. An adhesive was coated on both surfaces of the first and second polarizers, and sequentially laminated and cured as illustrated in FIG. 2 to manufacture a liquid crystal display.

TABLE 1

| | |
|---|---|
| Low moisture-permeable film | Polyethylene terephthalate (PET) film (in-plane retardation: 400~500 nm, thickness direction retardation: 8400 nm, thickness: 50 μm) |
| First polarizer | Polyvinyl alcohol (PVA, Kuraray Co., Ltd., thickness: 25 μm) |
| Protective film | Triacetyl cellulose film (Product name: NR01, Fuji Corporation in Japan, thickness: 40 μm) |
| Color filter substrate | General glass (Yelim GMS Corporation, thickness: 500 μm) |
| Liquid crystal layer | |
| TFT array substrate | |
| Protective Film | Triacetyl cellulose film (Product name: NR01, Fuji Corporation in Japan, thickness: 40 μm) |
| Second polarizer | Polyvinyl alcohol (PVA, Kuraray Co., Ltd., thickness: 25 μm) |
| Protective Film | Polyethylene terephthalate (PET) film (product name: COSMOSHINE SRF, TOYOBO, In-plane retardation: 8000~10,000 nm, thickness: 80 μm) |

Comparative Examples 1 to 6

A liquid crystal display was manufactured in the same manner as in Example 1, except that the film shown in Table 2 below was used instead of the polyethylene terephthalate film which is the low moisture-permeable film 6.

TABLE 2

| | |
|---|---|
| Comparative Example 1 | Polyethylene terephthalate (PET) film (COSMOSHINE SRF, TOYOBO, in-plane retardation: 8000 nm, thickness direction retardation: 9000 nm, thickness: 80 μm) |
| Comparative Example 2 | Acrylic film (LGC, thickness: 60 μm) |
| Comparative Example 3 | Triacetyl cellulose film (product name: KC4DR-1, Konica Corporation, thickness: 40 μm) |
| Comparative Example 4 | Cycloolefin polymer (COP)-based film (product name: ZBCOP, ZEON Corporation, thickness: 50 μm) |
| Comparative Example 5 | Polyethylene terephthalate (PET) film (in-plane retardation: 2000 nm, thickness direction retardation: 8000 nm, thickness: 50 μm) |
| Comparative Example 6 | Polyethylene terephthalate (PET) film (in-plane retardation: 500 nm, thickness direction retardation: 2000 nm, thickness: 50 μm) |

Evaluation

1. Shrinkage Force Measurement

The film to be measured shown in Table 3 below was cut out into a measurement sample having a long side in the measurement direction and a width of 5 mm and a length of 50 mm. Then, the measurement sample was set in a thermomechanical analyzer (DMA) "DMA-Q800" manufactured by TA Instruments, and the shrinkage force was measured in the measurement direction described in Table 3 at the initial normal temperature. Then, the measurement sample was heated at a temperature rising rate of 5° C./min, and then measured for the shrinkage force in the measurement direction occurring when the total measurement time at 70° C. was 75 minutes, and then cooled and measured for the shrinkage force in the measurement direction occurring about 1 hour after the shrinkage force was stabilized at 25° C. The results at each temperature are shown in Table 3 below. Moreover, the ratio of each shrinkage force relative to shrinkage force in the absorption-axial direction of a control group (second polarizer) was calculated, and the results are shown in Table 3 below.

Furthermore, the shrinkage force according to the temperature change of the films of Example 1 and Comparative Example 1 in the direction parallel to the absorption axis and in the direction perpendicular to the absorption axis was measured, and the results are shown by the graph in FIG. 6.

Example 1 is C, and the shrinkage force according to the temperature change in the direction parallel to the absorption axis of the film of Example 1 is D. According to FIG. 6, it can be confirmed that C has a high shrinkage force in both the high-temperature range and the normal temperature conversion range.

2. Evaluation of Coefficient of Thermal Expansion (CTE) Under High-Temperature Conditions In one direction (A direction) of the low moisture-permeable film of Example 1 and the polyethylene terephthalate film of Comparative Example 1 and in a B direction perpendicular to the A direction, measurements were performed three times using the TMA (Thermal Mechanical Analyzer: TA-Q400) under the following conditions, and the coefficient of thermal expansion, which is the average of the values measured in the temperature range from 40 to 80° C., was calculated and the results are shown in Table 4 below.

At this time, the films of Example 1 and Comparative Example 1 were wound in a roll shape through a cylindrical

TABLE 3

| | Measurement objects | Measurement direction | Shrinkage force (N) | | | Ratio of shrinkage force relative to control group (at |
|---|---|---|---|---|---|---|
| | | | Initial | 70° C. | 25° C. | 25° C.) |
| Control group | Second polarizer | Absorption-axial direction | 2.67 | 6.69 | 2.86 | — |
| Example 1 | Low moisture-permeable film | Direction parallel to absorption axis of control group | 2.68 | 1.84 | 1.06 | 37% |
| Comparative Example 1 | Polyethylene terephthalate film | | 2.63 | 1.51 | 0.31 | 11% |
| Comparative Example 2 | Acrylic film | | 1.46 | 0.02 | 0.60 | 21% |
| Comparative Example 3 | Triacetylcellulose film | | 2.45 | 1.12 | 0.38 | 13% |
| Comparative Example 4 | Cycloolefin polymer film | | 0.68 | 0.01 | 0.71 | 25% |

According to Table 3 above, it was confirmed that the ratio of the shrinkage force of the low moisture-permeable film of Example 1 to the shrinkage force of the control group was remarkably higher, specifically 30% or higher, than the ratio of the shrinkage force of the films of comparative examples.

In addition, in the graph of FIG. 6, the shrinkage force according to the temperature change in the direction perpendicular to the absorption axis of the film of Comparative Example 1 is A, the shrinkage force according to the temperature change in the direction parallel to the absorption axis of the film of Comparative Example 1 is B, the shrinkage force according to the temperature change in the direction parallel to the absorption axis of the film of paper tube, and the coefficient of thermal expansion was measured in the A and B directions of the roll center, while the coefficient of thermal expansion was measured in the A and B directions of the roll side.

Measurement conditions: heating was started at 25° C., the measurement was finished at 150° C., and the temperature rising rate was 5° C./min.

TABLE 4

| | Roll center | | Roll side | |
|---|---|---|---|---|
| (Unit: μm/m° C.) | A direction | B direction | A direction | B direction |
| Example 1 | 14.58 | −6.89 | 17.61 | 4.71 |
| Comparative Example 1 | 60.90 | 38.55 | 91.21 | 6.33 |

According to Table 4, it can be confirmed that in the case of Example 1, the coefficient of thermal expansion is balanced in both the A direction and the B direction, and the coefficient of thermal expansion of Example 1 is significantly lower than that of Comparative Example 1.

3. Evaluation of Pencil Hardness and Modulus

In one direction (A direction) of the low moisture-permeable film of Example 1 and the polyethylene terephthalate film of Comparative Example 1, and in a direction B perpendicular to the A direction, measurements were performed by a JIS K5600 method using a pencil hardness meter (SFD-051, Chungbuk Tech). As the pencil, a Mitsubishi 3H pencil was used. When measuring the pencil hardness, the pencil drawing speed was 5 mm/s, the angle of a pencil and a film was 45°, and the pencil load was 500 g. If scratches occurred twice or more when performing the evaluation five times, the measurement was performed with a pencil of 2H hardness. The hardness was allowed to lower in the order of 3H, 2H, and H, and the measurement was performed to confirm the hardness at which scratches occurred once or less in five evaluations. The results are shown in Table 5 below.

In addition, the sample was fixed in any one direction (A direction) of the low moisture-permeable film of Example 1 and the polyethylene terephthalate film of Comparative Example 1, and in a B direction perpendicular to the A direction, under conditions of a universal testing machine (LRX Plus, LLOYD), a sample width of 10 mm, a sample length of 70 mm, and a speed of 100 mm/m. Then, the modulus was determined from strain and stress obtained by stretching in one direction, and the results are shown in Table 5 below.

TABLE 5

| | Pencil hardness | | Modulus (GPa) | |
|---|---|---|---|---|
| | A direction | B direction | A direction | B direction |
| Example 1 | 3H | 3H | 5.28 | 6.01 |
| Comparative Example 1 | H | 3H | 2.92 | 5.69 |

According to Table 5, it was confirmed that, unlike Comparative Example 1, Example 1 had high hardness and similar modulus in both the A and the B directions.

4. Evaluation of Glass Warpage or Bending

The liquid crystal displays of Example 1 and Comparative Example 1 were held at 80° C. for 72 hours, then held at room temperature for 24 hours, and then the degree of bending was measured using a three-dimensional measuring device (manufacturer: Dukin Co., Ltd.), and the flatness was calculated and is shown in Table 6 below. The upper polarizing plate 3 was positioned so as to come to the front. The distance that the laser returns after hitting the upper polarizing plate 3 using the laser of the three-dimensional measuring device was calculated and thereby the degree of bending was calculated numerically. The flatness means a difference between a portion that is greatly bent toward the upper polarizing plate 3 and a portion that is greatly bent toward the lower polarizing plate 4 after the progress of the reliability. The larger the value, the greater the occurrence of bending.

In addition, two or more of the same liquid crystal displays as in Example 1 and Comparative Example 1 were respectively manufactured, the flatness was calculated by the method described above, and the results are shown in Table 6 below. The flatness averages of Examples 1-1 to 1-3 and the flatness averages of Comparative Examples 1-1 to 1-3 were calculated and are shown in Table 6 below.

Further, the results of bending prevention evaluations of Examples 1-1 to 1-3 using a three-dimensional measuring device (manufacturer: Dukin Co., Ltd) are shown in FIG. 7 (FIG. 7A: Example 1-1, FIG. 7B: Example 1-2, FIG. 7C: Example 1-3), and the results of bending prevention evaluation of Comparative Examples 1-1 to 1-3 are shown in FIG. 8 (FIG. 8A: Comparative Example 1-1, FIG. 8B: Comparative Example 1-2, FIG. 8C: Comparative Example 1-3).

TABLE 6

| | Example 1-1 | Example 1-2 | Example 1-3 | Comparative Example 1-1 | Comparative Example 1-2 | Comparative Example 1-3 |
|---|---|---|---|---|---|---|
| Flatness | 2.15 | 1.66 | 2.19 | 2.55 | 2.67 | 2.48 |
| Flatness average | | 2.00 | | | 2.57 | |

According to Table 6, it was confirmed that the examples have significantly lower flatness than the comparative examples, and thus in the examples, the occurrence of bending was small even after the progress of the high-temperature reliability.

5. Evaluation on Whether Rainbow Occurs

The liquid crystal displays of Example 1 and Comparative Examples 5 and 6 were connected to a power source and a pattern cable via an SR-UL2 device to drive the screen. The liquid crystal display on which the screen was driven was observed in a dark room to confirm the presence or absence of rainbow occurrence, the evaluation was performed according to the following evaluation criteria, and the results are shown in Table 7 below.

<Evaluation Criteria>

O: Rainbow was observed.

X: Rainbow stain did not exist.

TABLE 7

| | Example 1 | Comparative Example 5 | Comparative Example 6 |
|---|---|---|---|
| Rainbow occurred | X | X | O |

According to Table 7, it was confirmed that Example 1 has excellent visibility because no rainbow phenomenon occurred, whereas in Comparative Example 6 having thickness direction retardation (Rth) of 3000 nm or less, a rainbow phenomenon did occur.

| Explanation of symbols | | | |
|---|---|---|---|
| 1: | first polarizer | 2: | second polarizer |
| 3: | upper polarizing plate | 4: | lower polarizing plate |
| 5: | liquid crystal cell | 6: | low moisture-permeable film |
| 7, 8, 9: | protective film | | |
| 11: | color filter substrate | 10: | liquid crystal layer |
| | | 12: | TFT array substrate |

What is claimed is:

1. A liquid crystal display comprising:
a liquid crystal cell;
an upper polarizing plate provided on one surface of the liquid crystal cell and including a first polarizer and a low moisture-permeable film disposed on one surface of the first polarizer so as to face the liquid crystal cell; and
a lower polarizing plate provided on the other surface of the liquid crystal cell and including a second polarizer, wherein:
a ratio of a shrinkage force of the low moisture-permeable film in a direction parallel to the absorption-axis of the second polarizer to a shrinkage force of the second polarizer in an absorption-axial direction is 30% or more;
the low moisture-permeable film has in-plane retardation (Re) of 500 nm or less; and
the low moisture-permeable film has thickness direction retardation (Rth) of 8400 to 10,000 nm.

2. The liquid crystal display according to claim 1, wherein the low moisture-permeable film has a water vapor transmission rate of 30 g/m2·day or less.

3. The liquid crystal display according to claim 1, wherein the low moisture-permeable film has a coefficient of thermal expansion of −30 to 30 μm/m° C.

4. The liquid crystal display according to claim 1, wherein the low moisture-permeable film is a biaxially stretched polyester film.

5. The liquid crystal display according to claim 4, wherein the biaxially stretched polyester film is polyethylene terephthalate (PET) film.

6. The liquid crystal display according to claim 1, wherein the first and second polarizers are polyvinyl alcohol-based films.

7. The liquid crystal display according to claim 1, wherein:
the liquid crystal cell includes a color filter substrate, a TFT (thin film transistor) array substrate, and a liquid crystal layer interposed between the color filter substrate and the TFT array substrate;
the upper polarizing plate is provided on the color filter substrate of the liquid crystal cell; and
the lower polarizing plate is provided on the TFT array substrate of the liquid crystal cell.

8. The liquid crystal display according to claim 7, wherein the upper polarizing plate further includes a protective film interposed between the first polarizer and the color filter substrate.

9. The liquid crystal display according to claim 8, wherein the protective film is a COP (Cyclo-Olefin Polymer)-based film, an acrylic film, a TAC (Tri-Acetyl Cellulose)-based film, a COC (Cyclo-Olefin Copolymer)-based film, a PNB (Polynorbornene)-based film, or a PET (Polyethylene Terephthalate)-based film.

10. The liquid crystal display according to claim 1, wherein the lower polarizing plate further includes protective film(s) provided on at least one surface of the second polarizer.

11. The liquid crystal display according to claim 10, wherein the protective film(s) are each independently a COP (Cyclo-Olefin Polymer)-based film, an acrylic film, a TAC (Tri-Acetyl Cellulose)-based film, a COC (Cyclo-Olefin Copolymer)-based film, a PNB (Polynorbornene)-based film, or a PET (Polyethylene Terephthalate)-based film.

12. The liquid crystal display according to claim 1, further comprising a backlight unit disposed on one surface of the lower polarizing plate so as to face the liquid crystal cell.

* * * * *